United States Patent [19]
Bushman

[11] Patent Number: 5,982,180
[45] Date of Patent: Nov. 9, 1999

[54] METAL DETECTION SYSTEM AND PROCESS USING A HIGH VOLTAGE TO PRODUCE A VISIBLE ELECTRICAL DISCHARGE

[75] Inventor: Boyd B. Bushman, Lewisville, Tex.

[73] Assignee: Lockheed Martin Corporation, Fort Worth, Tex.

[21] Appl. No.: 08/862,545

[22] Filed: May 23, 1997

[51] Int. Cl.[6] .................................................. G01V 3/08
[52] U.S. Cl. ............................................................ 324/326
[58] Field of Search .................................... 324/326, 327, 324/536, 551, 554

[56] References Cited

U.S. PATENT DOCUMENTS 4,308,499  12/1981  Thierbach et al. ...................... 324/338

OTHER PUBLICATIONS

Martienssen, "Method and Means for Determining and Tracing Insulating, in Particular Oil–Carrying Strata" Alien Property Custodian Serial No. 333,469, May 18, 1943.

*Primary Examiner*—Walter E. Snow
*Attorney, Agent, or Firm*—Arthur F Zobal

[57] ABSTRACT

The apparatus includes an electrical circuit for producing a high voltage at a high frequency with very little current and an elongated and electrically insulated electrical conductive member coupled to the circuit for producing an electrical discharge when in close proximity to a metal object in the ground. The electrical circuit is capable of producing 50,000 volts and higher. In using the apparatus, the electrical conductive member may be moved to scan the ground over a metal object to obtain an image of the shape of the metal object.

23 Claims, 2 Drawing Sheets

METAL DETECTION SYSTEM AND PROCESS USING A HIGH VOLTAGE TO PRODUCE A VISIBLE ELECTRICAL DISCHARGE

BACKGROUND OF THE INVENTION

1. Field of the Invention

The invention relates to the detection of buried land mines and metal.

2. Description of the Prior Art

During acts of war, land mines are buried in the ground for the destruction of vehicles and/or personnel.

Currently there are many land mines buried in the ground throughout the world, their presence of which is unknown and which continue to render harm to vehicles and people.

A number of prior devices have been used in the detection of land mines. One such device is a magnetic coil. The magnetic coil can detect metal and can provide magnitude or intensity readings but it cannot provide configuration information and hence it cannot distinguish whether the metal detected is a land mine or some other form of metal.

Microwave devices have been used, however, the penetration of microwaves into the ground is very limited and these devices generally cannot detect deep mines or the new land mines which are mostly plastic.

Chemical resonance systems have been used to look for nitrogen in TNT, however, these systems are very bulky and heavy and their sweeping or scanning ability is limited.

SUMMARY OF THE INVENTION

It is an object of the invention to provide a new and useful system and process for detecting land mines and metal in the ground, which is effective, inexpensive, and relatively lightweight and which has a wide scanning range, a relatively deep penetrating range and can be used to detect the configuration of metal objects in the ground.

The apparatus comprises an electrical circuit for producing a high voltage at a high frequency with very little current and an elongated and electrically insulated electrical conductive member coupled to the circuit for producing an electrical discharge when in close proximity to a metal object in the ground. The electrical circuit is capable of producing 50,000 volts and higher.

In using the apparatus, the conductive member may be moved to scan the ground to detect metal objects and to obtain an image of the shape of the metal object visually or as recorded on a display means.

In field use, an A-C generator will be employed to produce an A-C voltage for operating the circuit. The circuit and the electrical conductive member may be carried manually in the detection process or the A-C generator, circuit, electrical conductive member and preferably a display device may be carried by a motor vehicle in the detection process.

BRIEF DESCRIPTION OF THE INVENTION

DESCRIPTION OF THE PREFERRED EMBODIMENT

Figure 1:
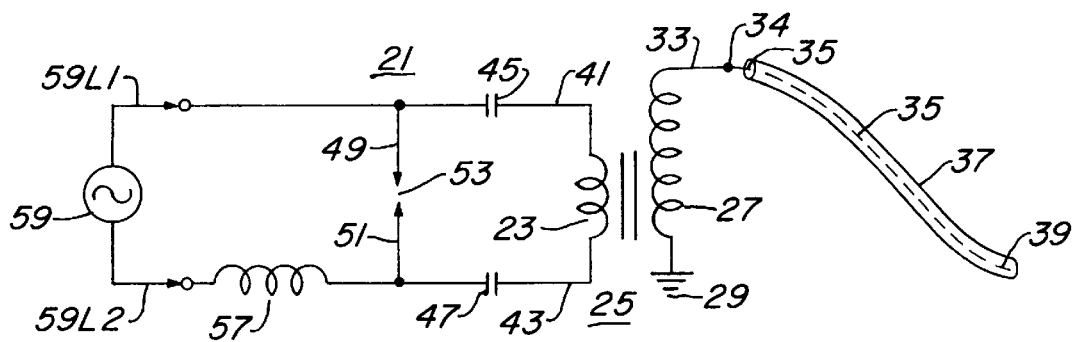
FIG. 1 is an electrical schematic of the apparatus of the invention.
Figure 2:
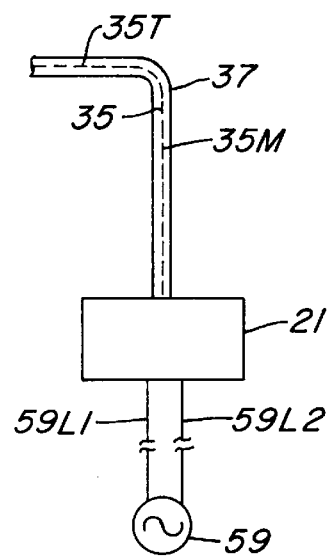
FIG. 2 is a top view of the apparatus of the invention.

Referring now to FIG. 1 of the drawings, the circuit 21 of the invention comprises a Tesla Coil comprising a primary coil 23 of a transformer 25 with a secondary coil 27 of many turns having one end 29 connected to ground 31 and a second end 33 connected at 34 to an elongated electrical conductive member 35 insulated with electrical insulation 37 from the connection 34 to its free end 39. The primary coil 23 may have only a single turn. The opposite ends of the primary coil 23 are connected to leads 41 and 43 having capacitors 45 and 47. Two wires 49 and 51 are connected to leads 45 and 47 to form a spark gap 53. A coil 57 is provided in lead 43. An A-C voltage from an A-C source 59 is applied by way of leads 59L1 and 59L2 to the leads 41 and 43. When an A.C. voltage from the source 59 is applied to the leads 41 and 43, the capacitors 45 and 47 charge and discharge across the gap 53 at a very high rate or frequency forming an oscillator and e.m.f's are induced in the secondary coil 27 at the frequency of the oscillating current in the primary coil 23. This results in a very high voltage at a high frequency being induced in the secondary coil 27 at a very low current i.e. in milliamps. In one embodiment, the oscillating voltage induced in the secondary coil 27 is about 50,000 volts. The member 35 may have a length of six feet up to about 27 feet or longer. Preferably the member 35 is L-shaped having a main portion 35M and a transverse end portion 35T as shown in FIG. 2. The purpose of the insulation 37 is to prevent the voltage on the member 35 from dissipating into the atmosphere to insure that the full high voltage is present at the free end 39.

Figure 5:
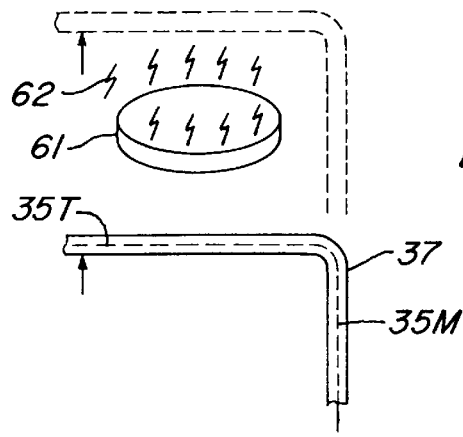
FIG. 5 illustrates electrical discharges from the apparatus of the invention to a round metal object as the apparatus is moved across the top of the metal object to scan the object.

When the circuit 21 is in operation and member 35 is placed in close proximity to a metal object, an electrical discharge occurs from the member 35 to the metal object. It has been found that this discharge occurs even if the metal object is covered with sand or dirt. Moreover, the tip 39 does not have to be grounded for the electrical discharge to occur. Referring to FIG. 5, there is shown an annular metal member 61 having the main shape of a land mine. As the member 35 scans the area above the member, the electrical discharges 62 outlines the shape of the member to depict its image or annular shape. This occurs when the object 61 is covered with several inches of sand or dirt. The same result will be obtained if the member 61 is buried in the ground with dirt or sand above the member 61 and the member 35 scans the ground above the object 61. The paths of the electrical discharges 62 can be viewed visually and/or the discharges can be recorded with the use of a camera with its shutter held open for a time period sufficient for the scan to take place to obtain an image of the shape of the object.

Figure 3:
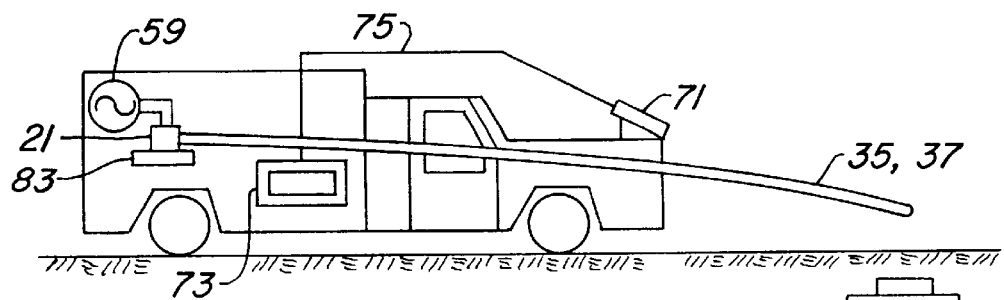
FIG. 3 is a side view of a motor vehicle used for carrying the apparatus of the invention.
Figure 4:
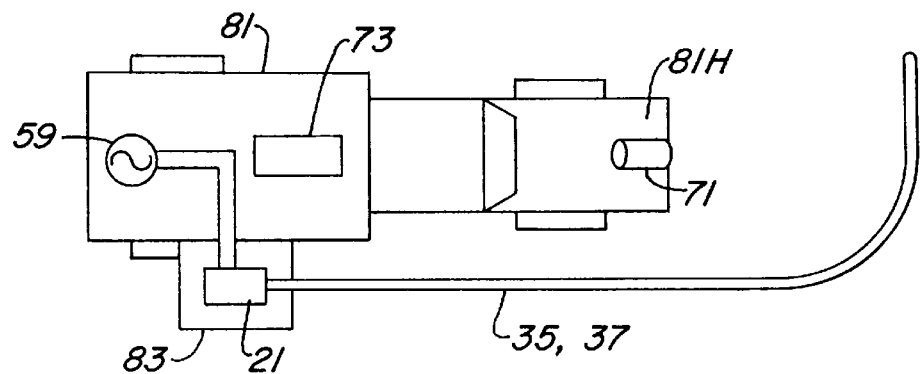
FIG. 4 is a top view of the motor vehicle of FIG. 2.
Figure 6:
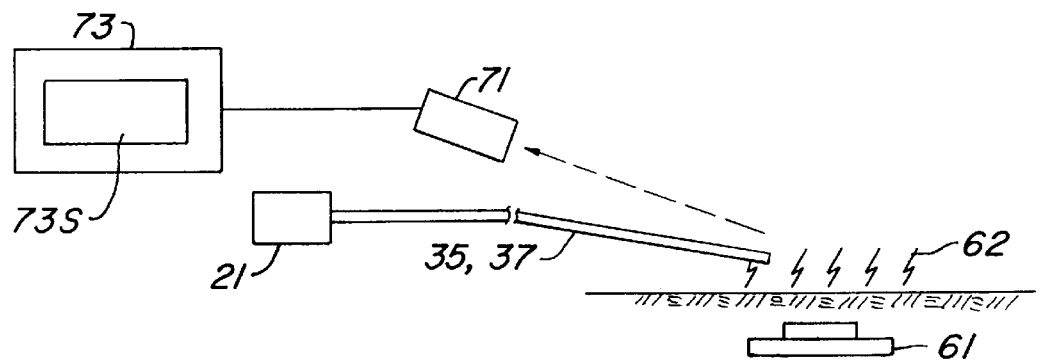
FIG. 6 is a schematic of a recording device comprising a video camera and a digital Video Effect Machine for recording an image of a metal object as obtained with the invention.

The apparatus 21 may be carried manually by a person or by a motor vehicle as shown in FIGS. 3 and 4 depending on the size of the Tesla Coil. In both cases the member 35 is relatively stiff and the coil 23, 27 is strong enough to support the member 35 plus the insulation 37 extending forward as shown in FIGS. 2–4. In the embodiment of FIG. 2, a person may carry the circuit 21 with the member 35 extending forward. The generator 59 may be supported on the ground and have long electrical leads 59L1 and 59L2 extending from the generator 59 to the circuit 21 to allow the operator to walk a given distance with the circuit 21 from the generator 59. On flat ground surfaces, the generator 59 may be supported and carried by a cart or the like moved by another person as the circuit 21 and member 35 are moved. It has been found that when the member 35, comes close to a metal object, electrical discharges or sparks will occur from the member 35 through the insulation 37. Thus the transverse portion 35T may be used to scan a metal object by merely moving the transverse portion 35T over the metal object to visually obtain an image of the shape of the object as shown in FIG. 5. In order to aid the operator in seeing the electrical discharges during daylight hours, the operator may wear glasses with suitable filter lenses. For manual use, a Tesla Coil 23, 27 capable of producing up to 50,000 volts may be used with the member 35 having a diameter of about 1/4 of an inch.

A larger Tesla Coil 23, 27 including the source 59, a video camera 71 and display equipment 73 may be supported by a motor vehicle such as a truck 81, operated by a gasoline or diesel engine, as shown in FIGS. 3 and 4. In this embodiment, the member 35 may have a length of about 20–27 feet with a diameter of about 1/4 of an inch if it is a solid copper wire or it may be a tubular electrical conductor member which can support itself over its length. The main portion 35M may have a length of about 25 feet with the transverse portion35T having a length of about 10 feet such that the main portion 35M extends forward of the vehicle with the transverse portion 35T being located horizontally ahead of and spaced from the front of the vehicle. The Tesla Coil 23, 27 will be large and strong enough to support the member 35 extending from the coil. The coil 23, 27 may be supported several feet or more from the side of the truck by a support 83 extending from the side of the truck 81 such that the member 35 is spaced from the vehicle with the main member 35M extending forward and downward from the coil 23, 27 and with the transverse portion 35T extending transverse from the member 35M such that it is located a substantial distance ahead of the vehicle 81 and transversely to the path of travel of the vehicle 81. This embodiment works the same way as the embodiment of FIG. 2 except that a video camera 71 and display device 73 are employed. In this respect as the vehicle 81 moves forward, and the transverse portion 35T passes over a buried metal object, the electrical discharges from the member 35T to the object will image or depict the shape of the object.

The device 73 may be a digital video effect machine. Electrical signals from the camera 71 are transmitted to the device 73 by way of leads 75. The device 73 has a visual display or screen 73S coupled thereto and which may be a television screen. As the object 61 is scanned by the member 35T and electrical discharges occur, the camera 71 converts the optical view to frames of electrical signals which are transmitted to the device 73 which cumulatively sums them for several frames and prepares the sum for display in the screen 73S. The device 73 in effect sums the last frame with the next frame from the camera such that the resulting sparks are preserved on the screen for a short period of time whereby a spark display of the shape or image of the object can be displayed on the screen.

In field use, the source 59, circuit 21 with a large Tesla Coil, with its member 35 supported by the Tesla Coil, camera 71 and devices and 73 and 73S may be carried by a truck 81 as shown in FIGS. 3 and 4. The source 59, and devices 73 and 73S are supported in the rear of the truck and the member 35 extends forward as shown in FIGS. 3 and 4. The camera 71 is supported by the hood 81H of the truck with the leads 75 extending to the device 73. The camera and device 73 may be battery operated or operated with power obtained from the A.C. source 59. The A.C. generator 21 may be gasoline operated with suitable exhausts (not shown) provided. An operator will be located in the rear of the truck while a person in the cab drives the truck. If a land mine is found, it may be destroyed then by the personnel or tagged for later destruction.

Most land mines have an outer case of metal. Many of the newer mines are formed of plastic, however, they all have metal in them and the outline of the metal parts can be detected and imaged with the apparatus of the invention and with knowledge of the various newer mines, they can be identified and distinguished from other metal members such as pipes etc.

The Tesla Coil (without the insulated member 35) as described in connection with FIG. 1 is commercially available from Science First Company of Buffalo, N.Y. It produces a voltage of 50,000 volts at a frequency of about $1 \times 10^6$ hertz and a current of about 1 m.a. It can produce a spark or electrical discharge of about 3 inches. In this device, capacitors 45 and 47 each is rated at 0.05 microfacads at 1600 volts. The number of turns in the secondary 27 are equal to 420 turns. The sparks from the device can penetrate about 3 inches into the ground which is sufficient to detect personnel mines which are buried about 3 inches below the surface of the earth.

The distance of penetration of the electrical discharge into the ground is proportional to the Tesla Coil voltage provided. Vehicle land mines are buried about 8 inches below the surface of the ground. For detection of these land mines, a Tesla Coil that produces about 100,000 volts is desired. Tesla Coils that produce this voltage and higher are available commercially. One such Tesla Coil, No. BTC-5, from Information Unlimited, Amhurst, N.H. produces 1.5 million volts with a spark of 60 inches.

Reference is made to pages 435 and 436 of "A Textbook of Physics", fifth edition, published by The Macmillan Company, by Louis Bevier Spinney, 1943, for a description of a Tesla Coil and its operation.

In one embodiment, the video or television camera 71 may be of the type manufactured by Sony of Tokyo, Japan and identified as DCR-VX1000. The digital video effect displace device 73 may be of the type manufactured by ABEKAS, Model A 53-D of Redwood City, Calif.

The electrical insulation 37 may be standard motor winding insulation or conventional plastic insulation used to cover electrical copper wire. The insulation 37 extends to cover the free end 39.

I claim:

1. An apparatus for detecting metal objects in the ground, comprising:

an electrical circuit for producing a high voltage at a high frequency with very little current, and an elongated and electrically insulated electrical conductive member coupled to said circuit for producing an electrical discharge visible to a person when said electrical conductive member is located in close proximity to a metal object in the ground.

2. The apparatus of claim 1, wherein:

said electrical circuit is capable of producing a voltage of at least 50,000 volts and a current less than one amphere.

3. The apparatus of claim 1, comprising:

display means for displaying visible electrical discharges produced as a function of the position of said electrical conductive member relative to a metal object in the ground to produce a visual display representative of an outline of a metal object detected.

4. The apparatus of claim 3, wherein:
said electrical circuit is capable of producing a voltage of at least 50,000 volts and a current less than one amphere.

5. The apparatus of claim 1, comprising:
a motor vehicle for supporting and moving said circuit and said electrical conductive member along the ground.

6. The apparatus of claim 1, comprising:
an A-C generator for generating an A-C voltage, and
means for applying said A-C voltage to said circuit for producing said high voltage at a high frequency.

7. The apparatus of claim 3, comprising:
an A-C generator for generating an A-C voltage, and
means for applying said A-C voltage to said circuit for producing said high voltage at a high frequency.

8. The apparatus of claim 3, comprising:
a motor vehicle for supporting and moving said circuit, said electrical conductive member and said display means along the ground.

9. The apparatus of claim 6, comprising:
a motor vehicle for supporting and moving said A-C generator, said circuit, said electrical conductive member along the ground.

10. The apparatus of claim 7, comprising:
a motor vehicle for supporting and moving said A-C generator, said circuit, said electrical conductive member and said display means along the ground.

11. The apparatus of claim 1, wherein:
said elongated electrical conductive member has a main portion which is coupled to said circuit and a free end portion which is transverse to said main portion such that the ground may be scanned by moving said transverse portion along and close to the ground.

12. An apparatus for detecting metal objects in the ground, comprising:
an electrical circuit for producing a high voltage at a high frequency with very little current, and
an elongated and electrically insulated electrical conductive member coupled to said circuit for producing an electrical discharge when said electrical conductive member is located in close proximity to a metal object in the ground,
said circuit comprises a transformer having a primary coil and a secondary coil, two input leads coupled to opposite ends of said primary coil for receiving an A-C voltage, at least one capacitor coupled to said primary coil and a spark gap for generating a high frequency voltage which is increased by said secondary coil for producing said high voltage at a high frequency with very little current.

13. A method of detecting metal objects in the ground, comprising the steps of:
operating an electrical circuit to produce a high voltage at a high frequency with very little current,
applying said high voltage to an elongated electrically insulated electrical conductive member, and
scanning the ground with said electrical conductive member located close to the ground while said electrical circuit is operated to produce said high voltage at a high frequency with very little current and obtaining an electrical discharge visible to a person from said electrical conductive member when said electrical conductive member is located relatively close to a metal object in the ground.

14. The method of claim 13, wherein:
said electrical circuit is operated to produce a voltage of at least 50,000 volts and a current less than one amphere.

15. The method of claim 13, comprising the steps of:
scanning an area above a metal object in the ground with said electrical conductive member to obtain a plurality of visual electrical discharges which depict said metal object to obtain an image of the shaped of the metal object.

16. The method of claim 15, comprising the step of:
visually displaying the electrical discharges as a function of the position of said electrical conductive member relative to the metal object in the ground.

17. The apparatus of claim 12, wherein:
said electrical discharge produced when said electrical conductive member is located in close proximity to a metal object in the ground, is visible to a person.

18. The apparatus of claim 12, wherein:
said electrical circuit is capable of producing a voltage of at least 50,000 volts and a current less than one amphere.

19. The apparatus of claim 18, wherein:
said electrical discharge produced when said electrical conductive member is located in close proximity to a metal object in the ground, is visible to a person.

20. The apparatus of claim 12, wherein:
said electrical circuit is capable of producing a voltage of at least 50,000 volts, a current less than one amphere, and an electrical discharge visible to a person when said electrical conductive member is located less than one foot from a metal object.

21. The apparatus of claim 20, wherein:
said elongated electrical conductive member has a main portion which is coupled to said circuit and a free end portion which is transverse to said main portion such that the ground may be scanned by moving said transverse portion along and close to the ground.

22. The apparatus of claim 18, wherein:
said electrical circuit is capable of producing said voltage at a frequency of at least $1 \times 10^6$ hertz,
said circuit comprises a transformer having a primary coil and a secondary coil, two input leads coupled to opposite ends of said primary coil for receiving an A-C voltage, at least one capacitor coupled to said primary coil and a spark gap for generating a high frequency voltage which is increased by said secondary coil for producing said high voltage at a high frequency with very little current.

23. A method of detecting metal objects in the ground, comprising the steps of:
operating an electrical circuit to produce a high voltage at a high frequency with very little current,
applying said high voltage to an elongated electrically insulated electrical conductive member, and
scanning the ground with said electrical conductive member located relatively close to the ground while said electrical circuit is operated to produce said high voltage at a high frequency with very little current and obtaining an electrical discharge visible to a person from said electrical conductive member when said electrical conductive member is located relatively close to a metal object in the ground.

* * * * *